United States Patent [19]

Maher, III et al.

[11] Patent Number: 5,020,013
[45] Date of Patent: May 28, 1991

[54] BIDIRECTIONAL VARIABLE BIT SHIFTER

[75] Inventors: Robert D. Maher, III, Carrollton; Patrick Antaki, Plano, both of Tex.

[73] Assignee: Cyrix Corporation, Richardson, Tex.

[21] Appl. No.: 415,037

[22] Filed: Sep. 29, 1989

[51] Int. Cl.⁵ ............................................. G06F 7/00
[52] U.S. Cl. .............................. 364/715.08; 364/900
[58] Field of Search ............... 364/900, 715.08, 745, 364/748

[56] References Cited

U.S. PATENT DOCUMENTS

| | | | |
|---|---|---|---|
| 3,274,556 | 9/1966 | Paul et al. | 364/900 |
| 3,961,750 | 6/1976 | Dao | 364/900 |
| 4,023,023 | 5/1977 | Bourrez et al. | 364/736 |
| 4,122,534 | 10/1978 | Cesaratto | 364/715.08 X |
| 4,149,263 | 4/1979 | Prioste | 364/900 |
| 4,295,202 | 10/1981 | Joyce et al. | 364/748 |
| 4,396,994 | 8/1983 | Kang et al. | 364/715.08 X |
| 4,437,166 | 3/1984 | O'Brien | 364/715.08 X |
| 4,472,788 | 9/1984 | Yamazaki | 364/715.08 X |
| 4,509,144 | 4/1985 | Palmer et al. | 364/715.08 X |
| 4,583,197 | 4/1986 | Chappell et al. | |
| 4,636,976 | 1/1987 | Takla | 364/715.08 |
| 4,653,019 | 3/1987 | Hodge et al. | 364/715.08 |
| 4,665,538 | 5/1987 | Machida | 364/715.08 X |
| 4,758,972 | 7/1988 | Frazier | 364/745 |
| 4,827,441 | 5/1989 | Someshwar et al. | 364/715.08 |
| 4,831,571 | 5/1989 | Tokumaru | 364/715.08 |

Primary Examiner—Gary V. Harkcom
Assistant Examiner—Tan V. Mai
Attorney, Agent, or Firm—Baker & Botts

[57] ABSTRACT

A bidirectional variable bit shifter (10) is disclosed which comprises a latch/input driver (12) coupled to a word shift array (14) coupled to a nibble shift array (16) coupled to a bit shift array (18) coupled to a latch/output driver (20). The bidirectional variable bit shifter (10) further comprises three sense amps (24, 26, 28) coupled to the word, nibble and bit shift arrays (14, 16, 18) respectively, and the outputs of the three sense amps (24, 26, 28) are coupled to the input of a logic-OR gate (30) which has as its output an Indicator Bit signal. The word, nibble and bit shift arrays (14, 16, 18) are coupled to control decode circuit (22) which receives and decodes information from a Microcode Control Bus and from three shift count control buses. Parallel data bits are input to the bidirectional variable bit shifter (10) through the latch/input driver (12), and shifted 0, 16, 32, 48, 64 or 80 bits by the word shift array (14), 0, 4, 8, or 12 bits by the nibble shift array (16), and 0, 1, 2 or 3 bits by the bit shift array (18). The word, nibble and bit shift arrays (14, 16 and 18) send signals to the sense amps (24, 26, 28) respectively when significant data bits are shifted right of the least significant bit on right shift operations which in turn signal logic-OR gate (30). The control decode circuit (22) controls the direction of shfits, the number of bit positions shifted, and the fill node within the word, nibble and bit shift arrays (14, 16, 18).

7 Claims, 3 Drawing Sheets

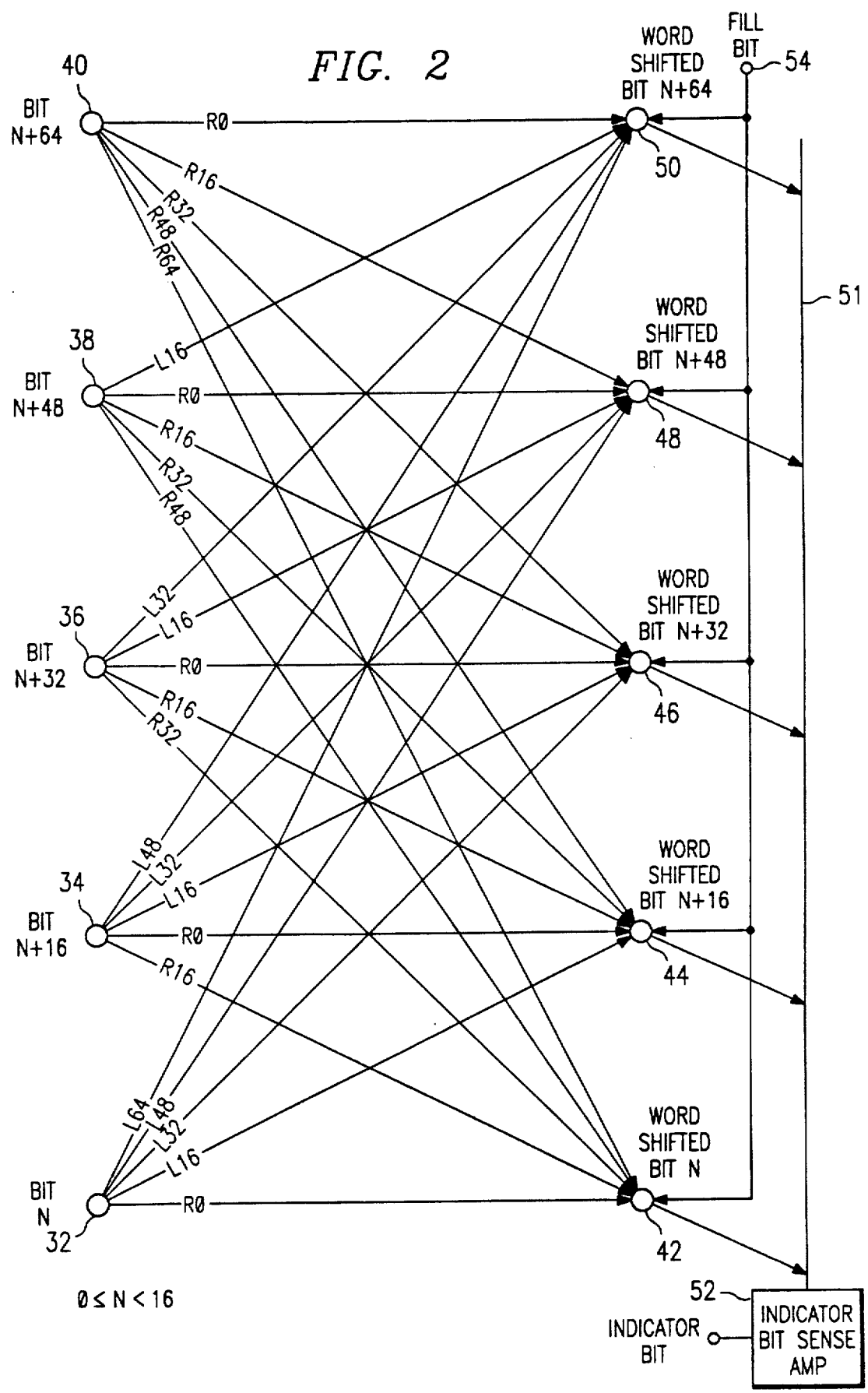

5,020,013

BIDIRECTIONAL VARIABLE BIT SHIFTER

TECHNICAL FIELD OF THE INVENTION

This invention relates in general to the field of digital electronic devices. More specifically, the present invention relates to a circuit for performing bidirectional variable bit length shifting operations.

BACKGROUND OF THE INVENTION

Digital electronic circuitry often operates on information represented by many parallel data bits. It is often necessary in mathematical operations within digital electronic circuitry to shift these data bits left or right selected numbers of bit positions. Circuitry for shifting data bits left and right is essential to arithmetic logic units in microprocessors and coprocessors.

Some bidirectional shifters presently used in digital electronic circuitry require that the data to be shifted be input into one input for left shift operations and into another input for right shift operations. Because of the need for routing the data to be shifted into different inputs, depending on whether a left or right shift operation is required, shifting of data in these present shifters takes more than one clock cycle and may require additional circuitry for routing the data to the appropriate input.

On right shift operations, data which is shifted to the right of the least significant bit of the data bits is lost. Present bit shifters which allow for shifting of bits a variable number of positions do not indicate whether significant data bits have been shifted to the right of the least significant bit on right shift operations.

Therefore, a need has arisen for a bit shifter which allows for unidirectional data flow and bidirectional, that is, left and right, shifting of variable bit positions, which also indicates whether significant data bits have been shifted to the right of the least significant bit on right shift operations. Furthermore, because of the importance of speed in digital electronic processing, a need has arisen for a bit shifter which outputs shifted data in a single clock cycle.

SUMMARY OF THE INVENTION

In accordance with the present invention, a bidirectional variable bit shifter is provided which substantially eliminates or reduces disadvantages and problems associated with prior bit shifters.

In accordance with the present invention, a bidirectional variable bit shifter is provided which allows for unidirectional data flow and shifts input data either left or right a variable number of bit positions. The bidirectional variable bit shifter of the present invention also indicates whether significant data bits have been shifted to the right of the least significant bit on right shift operations. Data is output from the bidirectional variable bit shifter of the present invention less than one-half clock cycle after data is input into the shifter.

According to one embodiment of the present invention, the bidirectional variable bit shifter comprises a latch/input driver, a word shift array for shifting bits 16 positions at a time, a nibble shift array for shifting bits four bit positions at a time, a bit shift array for shifting bits one bit position at a time and a latch/output driver for outputting the shifted data. Each shift array signals an INDICATOR BIT if a significant data bit has been right shifted past the least significant bit.

An important technical advantage of the present invention is that data is input through a single input stage and can be bidirectionally shifted left or right. The circuit of the present invention allows for variable bit shifting left or right within one clock cycle. A further technical advantage of the present invention is its ability to shift bits a variable number of bit positions and also indicate whether significant data bits have been shifted right of the least significant bit on right shift operations.

A further technical advantage of the present invention is the small number of transistors needed for each bit within the shifting circuitry. This small number of transistors allows for the semiconductor surface area occupied by the present invention to be largely confined by metal pitch parameters instead of transistor size and number.

Another technical advantage of the present invention is that, because the circuitry for each bit position is substantially identical, except for the presence of INDICATOR BIT generation logic, the circuits for all bits within the present invention have substantially identical parasitic load factors.

BRIEF DESCRIPTION OF THE DRAWINGS

A more complete understanding of the present invention may be acquired by referring to the detailed description and claims when considered in connection with the accompanying drawings, wherein:

FIG. 2 is a graphical representation of the shifting operation within the word shift array of the present invention;

DETAILED DESCRIPTION OF THE INVENTION

Figure 1:
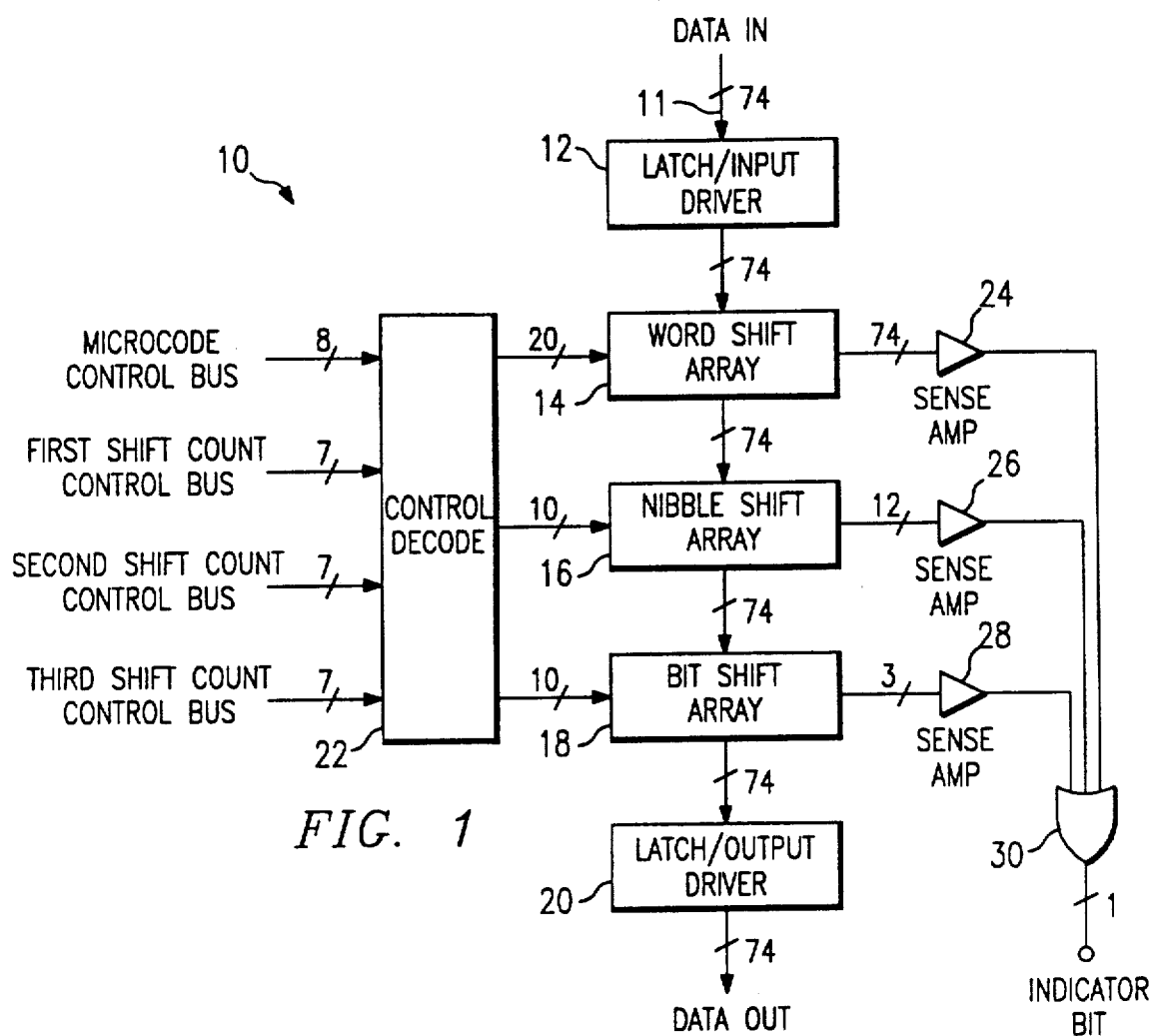
FIG. 1 is a block diagram of the bidirectional variable bit shifter of the present invention.

FIG. 1 illustrates a block diagram of the bidirectional variable bit shifter circuit of the present invention, indicated generally at 10. The bidirectional variable bit shifter circuit 10 operates on parallel data bits presented on a data bus 11. The data on data bus 11 which may comprise, for example, 74 parallel data bits is input into the shifter circuit 10 through a latch/input driver 12 which may comprise, for example, an inverter and latching pass transistor, and may be termed an input port. The present invention uses a single input port. The term single input port is used to distinguish prior art systems which require data to be input in one port for left shifts and another port for right shifts. The present invention uses a single input port for data which is to be shifted either right or left. Furthermore, the term input port should be understood to define a port through which parallel data bits are input into the present invention.

It should be understood that the circuit of the present invention is not a "barrel" shifter as this term is known in the art. The circuit contains no barrel or wrap-around feature by which, for example, data shifted beyond the least significant bit is reinserted in the most significant bit positions. Data shifted past the least significant and most significant ends of the present circuit is not recovered. The circuit of the present invention accordingly enjoys an increase in speed due to its simplified design.

The data is input into a word shift array 14 coupled to latch/input driver 12 and shifted either 0, 16, 32, 48, 64 or 80 bits, left or right. The data which has been shifted in word shift array 14 is then input into a nibble shift array 16 coupled to word shift array 14 and shifted by either 0, 4, 8 or 12 bits, left or right. The data which has been shifted in nibble shift array 16 is then input into a bit shift array 18 coupled to nibble shift array 16 and shifted either 0, 1, 2 or 3 bits, left or right.

Therefore, for example, a required shift of 27 bits requires a shift of 16 bits in the word shift array 14, a shift of 8 bits in the nibble shift array 16, and a shift of 3 bits in the bit shift array 18. It should be understood that the order in which the data passes through and is shifted by the word shift array 14, the nibble shift array 16, and the bit shift array 18 is merely disclosed as an exemplary embodiment for the purposes of teaching the present invention and may be changed so that, for example, the data first passes through the nibble shift array 16 and then the word shift array 14, and then the bit shift array 18 without departing from the spirit and scope of the invention as defined by the appended claims.

After the data has been left or right shifted in the word, nibble and bit shift arrays 14, 16 and 18, the data is latched and output through a latch/output driver 20, which comprises a single output port, coupled to bit shift array 18, which may comprise, for example, an inverter and latching pass transistor configured according to known methods such that the output data can be sent to other digital electronic devices. As discussed previously with reference to the single input port of the present invention, the term single output port is used to distinguish prior art systems which require input data to be input in one port for right shifts and another port for left shifts, and thus also have two output ports, one for outputting left shifted data and one for right shifted data. Furthermore, the term output port should be understood to define a port through which parallel data bits are output from the present invention.

The word shift array 14, nibble shift array 16, and bit shift array 18, are each coupled to and controlled by a control decode circuit 22. The control decode circuit 22 controls whether shifting is left or right, the number of bit positions shifted, and controls whether a one or a zero is filled in the appropriate most significant bits on right shift operations in the word shift array 14, nibble shift array 16, and bit shift array 18. The control decode circuit 22 decodes information from a MICROCODE CONTROL BUS and from three separate SHIFT COUNT BUSSES. Information on the MICROCODE CONTROL BUS input into the control decode circuit 22 determines whether the shift operations will be left or right, which of three SHIFT COUNT BUSSES are to be selected, and which fill mode will be selected. The fill mode determines whether logic 'ones' or 'zeroes' as fill bits will be shifted into the appropriate most significant bits on right shift operations. A left/right shift select signal is decoded from the MICROCODE CONTROL BUS. The control and data path widths of the MICROCODE CONTROL BUS and the SHIFT COUNT BUSSES as well as the 74 bit data busses shown in FIG. 1 are disclosed for the purpose of teaching the present invention and should not be construed to limit the scope of the present invention. The teachings of the present invention are equally applicable to a wide variety of data and control path widths dependant on the requirements of an integrated system of which the circuit 10 may comprise a single component.

If, on any right shift operation, significant data bits are shifted out past the least significant bit to the right, the word shift array 14, nibble shift array 16, and bit shift array 18 transmit a signal to sense amps 24, 26, or 28, coupled to arrays 14, 16 and 18 respectively. The outputs of sense amps 24, 26 and 28 are input into logical-Or gate 30. The output of logical-Or gate 30 is the INDICATOR BIT. The INDICATOR BIT signals that significant data bits have been shifted past the least significant bit during a right shift operation.

FIG. 2 is a graphical illustration of the function of the word shift array 14, in addition to the fan out of each line of data bus 11 and the fan in of each shifted bit within the word shift array 14. Data bus 11 of FIG. 1 represents a parallel data bus having, for example, 74 parallel lines. For purposes of this description, it is convenient to assign numbers to each of the lines on data bus 11. The least significant line, or bit, of data bus 11, is bit zero, while the most significant line, or bit, of data bus 11 is, for example, in a 74 line data bus, bit 73. The terms 'right' and 'left' used herein should be understood to be ordinal references, and not physical references. Thus, bit 0 is the right most bit, and, for example, bit 73 is the left most bit for a 74 bit data bus. Node 32 shown in FIG. 2 represents a bit N of data bus 11, where $16 > N \geq 0$. Node 34 represents a bit $N+16$ of data bus 11, node 36 represents a bit $N+32$ of data bus 11, node 38 represents a bit $N+48$ of data bus 11, and node 40 represents a bit $N+64$ of data bus 11.

Referring to node 32, right shift operations of value 16, 32, 48, 64 and 80 will shift bit N right of the least significant bit of the 74 bit data path through circuit 10. Therefore, a right shift operation of shift value greater than zero will enable word shifted bit N to pull down an indicator sense node 51 if bit N is a significant data bit. This signal is represented by sense node 51 coupling all the nodes 42 through 50 to an indicator bit sense amp 52 which is operable to output an INDICATOR BIT signal indicating the loss of significant data bits during a shift operation. A right shift operation of zero results in bit N being shifted zero positions, and therefore, node 42 takes on the value of bit N on a right shift zero operation. This operation is represented by a line labeled R0 drawn between node 32 and node 42. Node 42 thereby has the same value as bit N after the zero shift operation represented by the R0 line which is performed within the word shift array 14.

For a left shift 16 operation, bit N is shifted to the bit $N+16$ position. The L16 line drawn from node 32 to node 44 represents a left shift 16 operation. Node 44 represents bit position $N+16$ after a left shift 16 operation is performed within the word shift array 14. Line L32 between node 32 and node 46 represents a left shift 32 operation performed on bit N. During a left shift 32 operation, bit N is shifted to the $N+32$ position. Node 46 represents bit $N+32$ after a shift operation within the word shift array 14. The L48 line between node 32 and node 48 similarly represents a left shift 48 operation. After a left shift 48 operation, bit N is shifted to the bit $N+48$ position represented by node 48. Line L64 between node 32 and node 50 represents a left shift 64 operation performed on bit N. After a left shift 64 operation, bit N is shifted to the bit $N+64$ position. Node 50 represents bit $N+64$ after a shift operation within the word shift array 14. For a left shift 80 operation all data bits are lost and all word shifted bits are set to a logical value of zero. For right shift operations greater than zero the vacated word shifted bits are set to either a logical value of one or zero depending on the selected right shift fill mode.

Node 34 represents a bit N+16 on data bus 11. For right shift operations of shift value 32, 48, 64, or 80, bit N+16 will be shifted past the least significant bit position of the 74 bit data path through circuit 10. Therefore, a right shift operation of shift value greater than 16 will result in a signal sent to indicator bit sense 52 if bit N+16 is a significant data bit. In this case, a signal will be sent through sense node 51 to the indicator bit sense amp 52 if significant data bits have been lost in the shifting operation.

Line R16 drawn between node 34 and node 42 represents a right shift 16 operation performed on bit N+16. After the right shift 16 operation, bit N+16 is shifted to the bit N position which is represented by node 42. Line R0 drawn between node 34 and node 44 represents a right shift zero operation performed on bit N+16. After a right shift zero operation, bit N+16 is shifted to the bit N+16 position which is represented by node 44. Line L16 drawn between node 34 and node 46 represents a left shift 16 operation performed on bit N+16. After a left shift 16 operation, bit N+16 is shifted to bit N+32 which is represented by node 46. Line L32 drawn between node 34 and node 48 represents a left shift 32 operation performed on bit N+16. After a left shift 32 operation, bit N+16 is shifted to the bit N+48 position which is represented by node 48. A line L48 between node 34 and node 50 represents a left shift 48 operation performed on bit N+16. After the left shift 48 operation, bit N+16 is shifted to bit N+64 which is represented by node 50. For left shift operations of 80 or 64 bit positions, the vacated word shifted bits are set to a logical value of zero. For right shift operations greater than 16 bit positions, the vacated word shifted bits are set to a logical value of one or zero depending on the selected right shift fill mode.

Node 36 represents a bit N+32 on data bus 11. For right shift operations of shift values 48, 64, and 80 performed on bit N+32, a signal is sent through sense node 51 to indicator bit sense amp 52 if significant data bits have been lost in the shifting operation. Line R32 drawn between node 36 and node 42 represents a right shift 32 operation performed on bit N+32. After a right shift 32 operation, bit N+32 is shifted to bit N which is represented by node 42. Line R16, drawn between node 36 and node 44 represents a right shift 16 operation performed on bit N+32. After a right shift 16 operation, bit N+32 is shifted to bit N+16 which is represented by node 44. Line R0 drawn between node 36 and node 46 represents a right shift 0 operation performed on bit N+32. After a right shift 0 operation, bit N+32 is shifted to bit N+32 which is represented by node 46. Line L16 drawn between node 36 and node 48 represents a left shift 16 operation performed on bit N+32. After a left shift 16 operation, bit N+32 is shifted to bit N+48 which is represented by node 48. Line L32 drawn between node 36 and node 50 represents a left shift 32 operation performed on bit N+32. After a left shift 32 operation, bit N+32 is shifted to bit N+64 which is represented by node 50. For left shift operations of 80, 64 or 48 bit positions, the vacated word shifted bits are set to a logical value of zero. For right shift operations greater than 48 bit positions, the vacated word shifted bits are set to a logical value of one or zero depending on the selected right shift fill mode.

Node 38 represents a bit N+48 on data bus 11. For right shift operations of shift values 64 and 80 performed on bit N+48, a signal is sent through sense node 51 to indicator bit sense amp 52 if signficiant data bits have been lost during the shift operation. Line R48 drawn between node 38 and node 42 represents a right shift 48 operation performed on bit N+48. After a right shift 48 operation, bit N+48 is shifted to bit N which is represented by node 42. Line R32 drawn between node 38 and node 44 represents a right shift 32 operation performed on bit N+48. After a right shift 32 operation, bit N+48 is shifted to bit N+16 which is represented by node 44. Line R16 drawn between node 38 and node 46 represents a right shift 16 operation performed on bit N+48. After a right shift 16 operation, bit N+48 is shifted to bit N+32 which is represented by node 46. Line R0 drawn between node 38 and node 48 represents a right shift 0 operation performed on bit N+48. After a right shift 0 operation, bit N+48 is shifted to bit N+48 which is represented by node 48. Line L16 drawn between node 38 and node 50 represents a left shift 16 operation performed on bit N+48. After a left shift 16 operation, bit N+48 is shifted to bit N+64 which is represented by node 50. For left shift operations of 80, 64, 48 or 32 bit positions, the vacated word shifted bits are set to a logical value of zero. For right shift operations greater than 48 bit positions, the vacated word shifted bits are set to a logical value of one or zero depending on the selected right shift fill mode.

Node 40 represents bit N+64 of data bus 11. A right shift 80 operation shifts bit N+64 to the right of the least significant bit. In this case, a signal is sent to indicator bit sense amp 52 through sense node 51 if bit N+64 is a significant bit on a right shift 80 operation. Line R64 drawn between node 40 and node 42 represents a right shift 64 operation performed on bit N+64. After a right shift 64 operation, bit N+64 is shifted to bit N which is represented by node 42. Line R48 drawn between node 40 and node 44 represents a right shift 48 operation performed on bit N+64. After a right shift 48 operation, bit N+64 is shifted to bit N+16 which is represented by node 44. Line R32 drawn between node 40 and node 46 represents a right shift 32 operation performed on bit N+64. After a right shift 32 operation, bit N+64 is shifted to bit N+32 which is represented by node 46. Line R16 drawn between node 40 and node 48 represents a right shift 16 operation performed on bit N+64. After a right shift 16 operation, bit N+64 is shifted to bit N+48 which is represented by node 48. Line R0 drawn between node 40 and node 50 represents a right shift 0 operation performed on bit N+64. After a right shift 0 operation, bit N+64 is shifted to bit N+64 which is represented by node 50. For all left shift operations, the vacated word shifted bits are set to a logical value of zero. For right shift operations greater than 64 bit positions, the vacated word shifted bits are set to a logical value of one or zero depending on the selected right shift fill mode.

In summary, nodes 32, 34, 36, 38, and 40 represent pre-shifted bits, while nodes 42, 44, 46, 48, and 50 represent the shifted bits, or bits output by word shift array 14.

For the data bus 11 which comprises z data bits, where z is a positive integer, right shift operations require the writing in of bit values to the bit positions greater than (z−1)—SHIFT COUNT, where SHIFT COUNT is the number of bits to be shifted. For example, if z=80, then the most significant bit is numbered 79, that is, (z−1), and a right shift 16 operation would require the writing in of bit values to bit positions 64 through 79. A fill bit node 54 of FIG. 2 is represented as an input into node 42, node 44, node 46, node 48 and node 50 and is intended to illustrate this writing in of bit values. Thus, the appropriate most significant bits are filled with either logical 'ones' or 'zeros', depending on a selectable fill mode, on right shift operations. For example, during a right shift operation, fill bit node 54 could be set to either a logical 'one' or 'zero' depending on what logical value was desired to be inserted into the bit positions vacated during the right shift operation.

The nibble shift array 16 of FIG. 1 operates similarly to word shift array 14, except that the shifting operations in the nibble shift array 16 are of length 0, 4, 8 or 12 bits. The bit shift array 18 also operates similarly to word shift array 14, except that the shifting operations in the bit shift array 18 are of length 0, 1, 2 or 3 bits. A graphical illustration of the operation of nibble shift array 16 and bit shift array 18 in the format of FIG. 2 would be nearly identical to FIG. 2 with only the numbers on the lines representing shift operations, and the representative bits needing to be altered. For example, for the nibble shift array 16, bits N, N+4, N+8, and N+12 would each be represented as being shifted 3, 4, 8 or 12 bits left or right.

Figure 3:
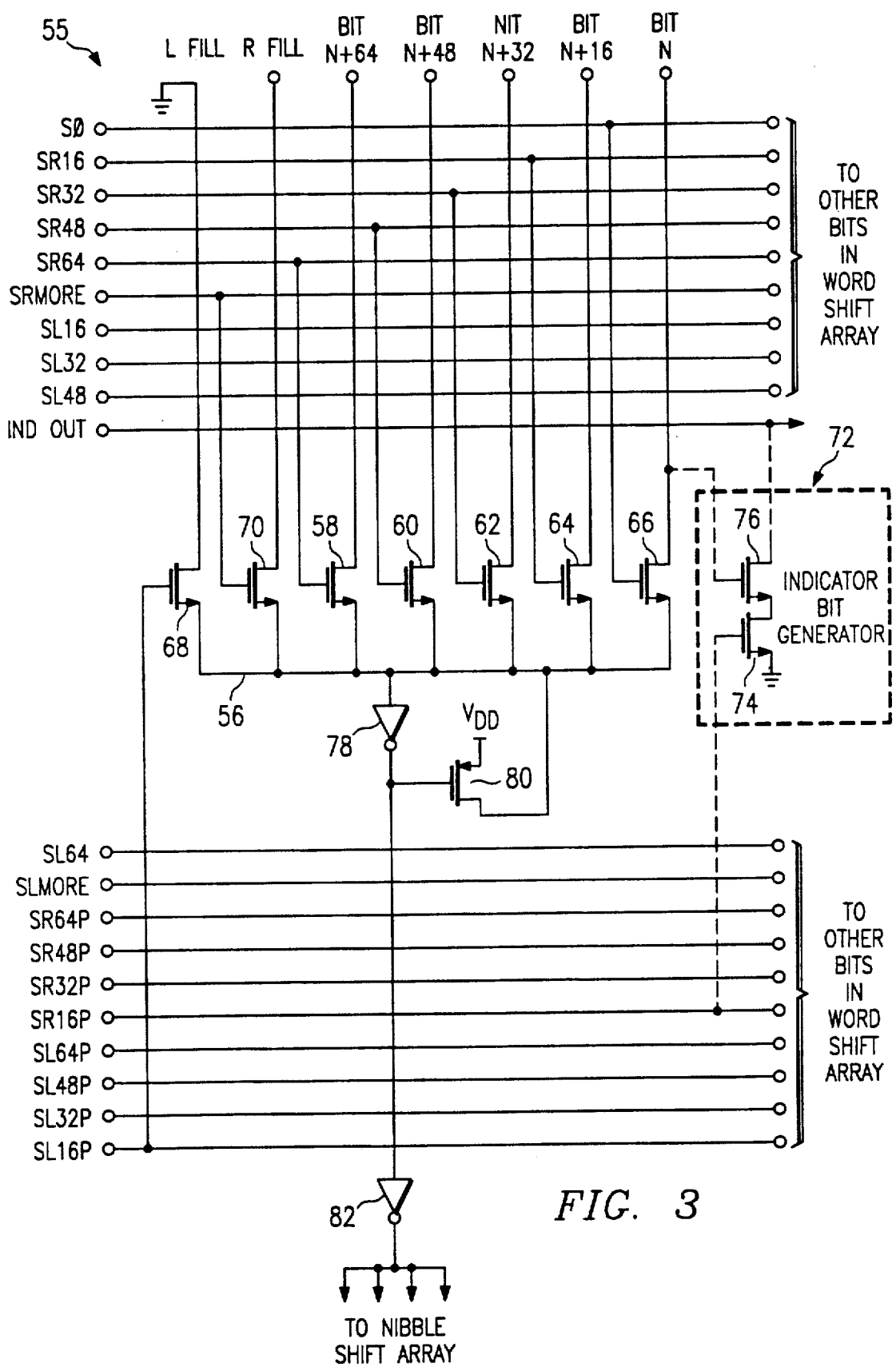
FIG. 3 is a schematic diagram which illustrates exemplary circuitry for shifting data bits within the word shift array of the present invention.

FIG. 3 is a schematic diagram which represents a single exemplary embodiment of a circuitry cell, indicated generally at 55, by which a bit may be shifted within the word shift array 14. Word shift array 14 may comprise a parallel connection of 74 circuits similar to circuit 55 to provide for word shift operation for each of the 74 data bits able to be shifted by circuit 10. Word shifted bit N, represented as node 56 in FIG. 3, represents bit N after a shift operation in the word shift array 14. As in FIG. 2, in FIG. 3, N is greater than or equal to zero and less than 16. Control lines SO, SR16, SR32, SR48, SR64, SRMORE, SL16, SL32, SL48, SL64, and SLMORE operate to enable pass transistors 58, 60, 62, 64, and 66 to allow the appropriate bit to be shifted into the new word shifted bit N. A pass transistor 68 is enabled by control line SL16P, coupled to the gate of pass transistor 68, so that on left shift operations, electrical ground, representing a logical value of 0, will be multiplexed into node 56 through pass transistor 68, because there are no bits right of bit zero to shift in. This corresponds to the fact that circuit 10 fills with logical zeroes in the least significant bit positions during left shift operations as opposed to being able to selectively fill with either logical ones or zeroes during right shift operations as discussed previously.

For a right shift 80 operation, a control signal SRMORE, which is generated by control decode circuit 22 and is coupled to the gate of pass transistor 70, enables pass transistor 70 such that right fill bit, represented by signal R FILL, is shifted into bit N represented by node 56. The source of pass transistor 70 is coupled to node 56 and the drain of pass transistor 70 is coupled to the R FILL signal.

For a right shift 64 operation, a control signal SR64, which is generated by control decode circuit 22 and is coupled to the gate of pass transistor 58, enables pass transistor 58 such that bit N+64 is shifted into bit N represented by node 56. The source of pass transistor 58 is coupled to node 56 and the drain of pass transistor 58 is coupled to bit N+64 of data bus 11. At any one time, only one pass transistor will be enabled, and thus pass transistors 58, 60, 62, 64, 66, 68, and 70 are operable to multiplex data bits into node 56.

For a right shift 48 operation, a control signal SR48 also generated by control and decode circuit 22 and coupled to the gate of pass transistor 60, enables pass transistor 60 such that bit N+48 is shifted into bit N represented by node 56. The source of pass transistor 60 is coupled to node 56, and its drain is coupled to bit N+48.

For a right shift 32 operation, a control signal SR32, also generated by control and decode circuit 22 and coupled to the gate of pass transistor 62, enables pass transistor 62 such that bit N+32 is shifted into bit N represented by node 56. The source of pass transistor 62 is coupled to node 56, and its drain is coupled to bit N+32.

For a right shift 16 operation, a control signal SR16, also generated by control and decode circuit 22 and coupled to the gate of pass transistor 64, enables pass transistor 64 such that bit N+16 is shifted to bit N represented by node 56. The source of pass transistor 64 is coupled to node 56, and its drain is coupled to bit N+16.

For a right shift zero operation, a control signal SO, also generated by control and decode circuit 22 and coupled to the gate of pass transistor 66, enables pass transistor 66 such that bit N is shifted to bit N represented by node 56. The source of pass transistor 66 is coupled to node 56, and its drain is coupled to bit N.

The SL16, SL32, SL48, SL64 and SLMORE control signals are appropriately coupled to the gates of the pass transistors 58, 60, 62, 64, 66 and 70 of other cells in the same manner as SO, SR16, SR32, SR48, SR64 and SRMORE are coupled in the circuitry cell 55 of FIG. 3. For example, for a cell in which node 56 represents bit 50, SO is coupled to the gate of pass transistor 60 of that cell and its drain is coupled to bit N where N=50, SR16 is coupled to the gate of pass transistor 58 of that cell and its drain is coupled to bit N+16, with N=50, SL16 is coupled to the gate of pass transistor 62 of that cell and its drain is coupled to bit N-16, with N=50, SL32 is coupled to the gate of pass transistor 64 and its drain is coupled to bit N-32 with N=50. SL48 is coupled to the gate of pass transistor 66 of that cell and its drain is coupled to bit N-48 with N=50, SR32P is coupled to the gate of pass transistor 70 of that cell and its drain is coupled to the eight fill bit, and SL64P is coupled to the gate of pass transistor 68 of that cell and its drain is coupled to ground.

Because the least significant bit position is bit 0, left shift operations require that logic level 'zero' be written into those bit positions which call for the shifting in of bits with bit positions less than zero. Thus, logical 'zeroes' are filled into the appropriate least significant bits on left shift operations. Pass transistor 68 is enabled by a control signal SL16P generated by control and decode circuit 22 such that electrical ground or logic level 'zero' is shifted into bit N. The drain of pass transistor 68 is coupled to node 56, and its source is coupled to electrical ground.

Because FIG. 3 illustrates word shifted bit N at node 56, where 16<N≦0, control line SL16P is coupled to the gate of pass transistor 68 for filling in 'zeroes' into bits 0-15 or left shift operation of shift value greater than 0 in word array 14. For 32<N≦16, control line SL32P is coupled to each appropriate L/FILL pass transistor gate to allow 'zeroes' to be written into bits 16-31 on left shift operation of shift value greater than 16 in word shift array 14. For 48<N≦32, control line SL48P is coupled to each appropriate L/FILL pass transistor gate to allow 'zeroes' to be written into bits 32-47 on left shift operations of shift value greater than 32 in word array 14. For 64<N≦48, control line SL64P is coupled to each appropriate LFILL pass transistor gate to allow 'zeroes' to be written into bits 48-63 on left shift operation of shift value greater than 48 in word array 14. For 80<N≦64, control line SLMORE is coupled to each appropriate L/FILL pass transistor gate to allow 'zeroes' to be written into bits 64-79 on left shift operations of shift value greater than 64 in word array 14.

An INDICATOR BIT generator, indicated generally at 72, is coupled to electrical ground whenever a right shift operation results in a significant data bit being shifted to the right of the least significant bit. INDICATOR BIT generator 72 may, for example, be comprised of two pass transistors 74 and 76. Pass transistor 74 is enabled by a control signal SR16P generated by control and decode circuit 22, while pass transistor 76 is enabled if bit N is a significant data bit. If both transistors 74 and 76 are enabled, then electrical ground, which is coupled to the source of pass transistor 74, passes through pass transistor 74 and 76 to IND OUT, which comprises an indicator bit signal line. The drain of pass transistor 76 is coupled to the IND OUT line and its source is coupled to the drain of pass transistor 74. The gate of pass transistor 76 is coupled to bit N.

Because FIG. 3 illustrates word shifted bit N at node 56, where 16<N≦0, control signal SR16P is coupled to the gate of pass transistor 74 of the INDICATOR BIT generator 72. Control signal SR16P enables the pass transistor 74 whenever a right shift operation of shift value greater than zero is required in shift array 14. Therefore, on any shift right operation of shift value greater than zero in word shift array 14, where bits 0-15 are significant data bits, the INDICATOR BIT signal will indicate the presence of the significant data bit by being pulled to electrical ground.

An indicator bit generator 72 is present for every circuitry cell 55 within the word shift array 14. Each indicator bit generator 72 is wire ORed to the IND OUT signal line which is coupled to sense amp 24 of FIG. 1. Control lines SR16P, SR32P, SR48P, SR64P, and SRMORE are used to enable each indicator bit generator 72. As discussed previously, control signal SR16P enables the indicator bit generators 72 for bits 0-15 on all right shift operations of shift greater than zero. Control signal SR32P is coupled to the first pass transistor in the INDICATOR BIT generators for 32<N≦16, and enables this transistor on all right shift operations of shift value greater than 16. Control line SR48P is coupled to the first pass transistor in the INDICATOR BIT generators for 48<N≦32, and enables this transistor on all right shift operation of shift value greater than 32. Control line SR64P is coupled to the first pass transistor in the INDICATOR BIT generators for 64<N≦48, and enables this transistor on all right shift operations of shift value greater than 48. Control line SRMORE is coupled to the first pass transistor in the INDICATOR BIT generators for 80<N≦64, and enables this transistor on all right shift operations of shift value greater than 64.

Pass transistors 58, 60, 62, 64, 66, 68, 70, 74 and 76 may comprise n-channel transistors, and may be enabled by raising their gate voltage to a logic level 'one' state, for example, five volts.

Control signals S0, SR16, SR32, SR48, SR64, SRMORE, SL16, SL32, SL48, SL64, SLMORE, SR64P, SR48P, SR32P, SR16P, SL64P, SL48P, SL32P and SL16P are all generated by the control decode circuit 22 of FIG. 1. Control decode circuit 22 decodes information from the MICROCODE CONTROL BUS and the three Shift Count Busses by known means to generate the control signals illustrated in FIG. 3.

Because the nibble shift array 16 of FIG. 1 only shifts by 0, 4, 8 or 12 bit positions, fewer control signals are needed for its control. Nibble shift array 16 does not require control signals for writing in 'zeroes' on left shifts. These 'zeroes' are hardwired into bits 0-11 on the appropriate left shift operation. Nibble shift array 16 requires only three control lines for INDICATOR BIT logic, since only bits 0-11 can be shifted right of the least significant bit during right shift operations. Therefore, nibble shift array 16 requires control signals for controlling the following operations: shift zero, shift left four, shift left 8, shift left 12, shift right 4, shift right 8, shift right 12, INDICATOR BIT control right 4, and INDICATOR BIT control 8 (the INDICATOR BIT control 12 function is accomplished by the shift right 12 control line).

Bit shift array 18 of FIG. 1 is identical to the nibble shift array 16 except that instead of shift operations of 0, 4, 8, or 12 bit positions, shifting is done in lengths of 0, 1, 2 or 3 bit positions.

Referring again to FIG. 3, node 56 represents bit N after the shift operation has taken place in the word shift array 14. Bit N is output and coupled to the nibble shift array 16 through an inverter 78 which is coupled to an inverter 82. A p-channel pass transistor 80 is used to assist in achieving a complete voltage level for the appropriate logical values present on node 56. The drain of pass transistor 80 is coupled to node 56 while the source is coupled to $V_{DD}$. The gate of pass transistor 80 is coupled to the output of inverter 78. Pass transistor 80 is enabled by applying a logic level 'zero' to its gate.

While for the most part, circuit 55 is exemplary of the circuits used for each bit in each of word shift array 14, nibble shift array 16 and bit shift array 18, there are some minor deviations. For example, for the nibble shift array 16, the INDICATOR BIT generator 72 of FIG. 3 is not needed for every bit. Because the nibble shift array 16 can only shift a maximum of 12 bits, INDICATOR BIT generator circuitry is needed only for bits 0-11. Additionally, for the bit shift array 18, the INDICATOR BIT generator 72 of FIG. 3 is not needed for every bit. Because the bit shift array 18 can only shift a maximum of 3 bits, INDICATOR BIT generator circuitry is needed only for bits 0-2.

Figure 4:
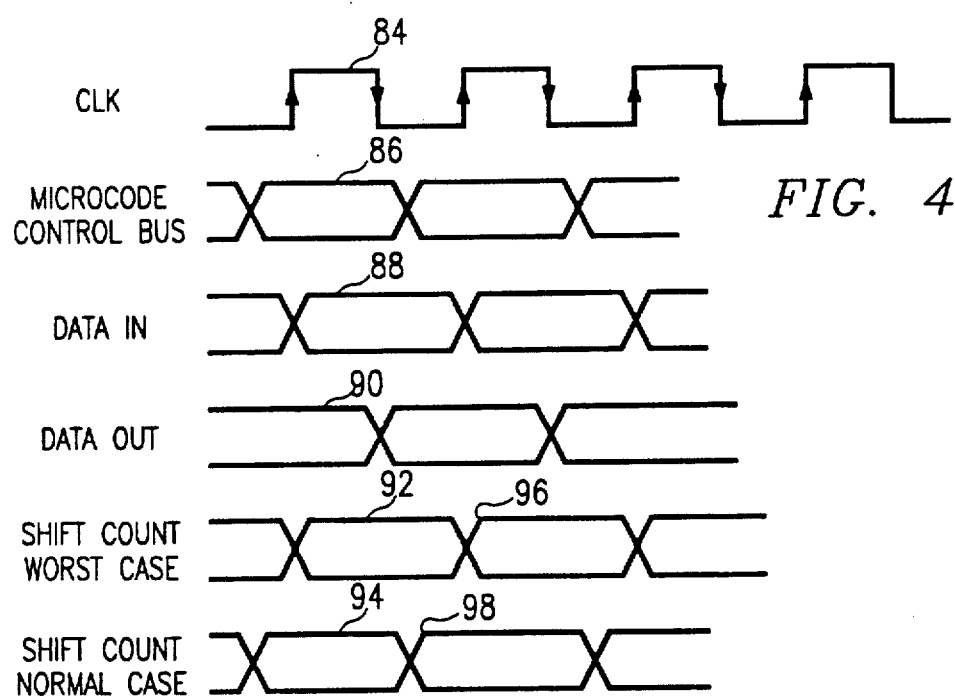
FIG. 4 is a timing diagram which illustrates the operation of the bidirectional variable bit shifter circuit of the present invention.

FIG. 4 is a timing diagram illustrating the operation of circuit 10 of FIG. 1. Clock signal 84 is a square wave having a frequency, for example, of 25 megahertz. Signal 86 represents data on the MICROCODE CONTROL bus. This data becomes valid immediately after the falling edge of clock signal 84. A DATA IN signal 88 represents the data which is input into word shift array 14. This data becomes valid on the rising edge of clock signal 84. A DATA OUT signal 90 represents the data which is output from circuit 10. Signal 92 represents a shift count worst case signal, that is, the latest that data can be valid on the shift count bus and still allow for valid shifting within one clock cycle. Signal 92 shows that the shift count worst case exists when the shift count becomes valid after the rising edge of clock signal 84, illustrated by point 96 of FIG. 4. Signal 94 represents a shift count normal case signal. In the normal case operation, the shift count signal is valid before the rising edge of clock signal 84, illustrated by point 98 of FIG. 4, allowing each shift array to be programmed prior to the presence of valid input data.

Referring now to Data In signal 88, data is latched into shifter circuit 10 on the rising edge of clock signal 84. Data Out signal 90 illustrates that data is latched out of shifter circuit 10 on the falling edge of clock signal 84. Thus FIG. 4 illustrates that data is shifted by shifter circuit 10 in half of one clock cycle, since the shifting operations occur between the latching in and out of data, and that new data can be latched on the output of the shifter circuit 10 every clock cycle.

In accordance with the foregoing description, the present invention provides the important technical advantage of allowing unidirectional data input with bidirectional, left and right, shifting operations. The foregoing description also demonstrates the further technical advantage of the present invention of the presence of an INDICATOR BIT in a variable bit shifter. A still further technical advantage of the present invention is its ability to output latched shifted data in one clock cycle. Furthermore, the small number of transistors needed for each cell within the present invention, and the substantially identical makeup of each cell, provides for the use of a small semiconductor surface area and uniform parasitic load factors.

Although the present invention has been described in detail, it should be understood that various changes, substitutions and alterations can be made hereto without departing from the spirit and scope of the invention as defined by the appended claims.

What is claimed is:

1. A circuit for shifting a plurality of data bits comprising:
    input circuitry operable to receive, store and output the plurality of data bits;
    a word shift array operable to selectively shift said plurality of data bits a multiple of a first preselected number of bit positions in either one of two selectable directions, said word shift array coupled to said input circuitry;
    a nibble shift array operable to shift said plurality of data bits a multiple of a second preselected number of bit positions in said selected direction, wherein said second preselected number is less than said first preselected number, said nibble shift array coupled to said work shift array;
    a bit shift array operable to shift said plurality of data bits a multiple of a third preselected number of bit positions in said selected direction, wherein said third preselected number is less than said second preselected number, said bit shift array coupled to said nibble shift array;
    output circuitry coupled to said bit shift array and operable to receive, store and output the shifted data bits; and
    a plurality of indicator circuits, one of said plurality coupled to each of said word, nibble and bit shift arrays for detecting whether significant data bits have been shifted right past the least significant bit on right shift operations, said indicator circuits comprising a bit indicator circuit associated with each data bit which could be shifted right past the least significant bit position during right shift operations, said bit indicator circuit each comprising:
    a first pass transistor having a drain, a source coupled to a predetermined voltage level, and a gate coupled to an indicator control signal associated with a selected plurality of data bits; and a second pass transistor having a source coupled to said drain of said first pass transistor, a gate coupled to a respective data bit associated with a particular bit indicator circuit, and a drain coupled to an indicator output signal line coupled to a selected plurality of bit indicator circuits;
    said indicator circuits each further comprising:
    a sense amplifier circuit having an output and an input coupled to said indicator output signal line and operable to receive signals indicating the shifting of significant data bits rights past the least significant bit position from said bit indicator circuitries through said indicator output signal line;
    a logic-OR circuit having a plurality of inputs and an output, one of said plurality of inputs coupled to a respective output of said sense amplifier circuits said logic-OR circuit operable to generate an indicator bit as the logic-OR function of the outputs of said sense or amplifier circuits; and
    control decode circuitry coupled to and operable to control said word, nibble and bit shift arrays and to receive and decode control signals input into said control decode circuitry.

2. The circuit of claim 1 wherein said first preselected number of bit positions is equal to sixteen, said second preselected number of bit positions is equal to four, and said third preselected number of bit positions is equal to one.

3. The circuit of claim 1 wherein said word shift array, said nibble shift array and said bit shift array comprise a plurality of circuitry cells associated with each data bit within each of said arrays, each of said circuitry cells comprising:
    a plurality of multiplexing pass transistors, each multiplexing pass transistor associated with a pre-shifted bit which could be shifted into a particular bit within each array, said plurality of multiplexing pass transistors operable to couple a particular pre-shifted bit to said particular bit responsive to a control signal enabling a particular multiplexing pass transistor of said plurality associated with said particular pre-shifted bit, said control signal coupled to the gate of said particular multiplexing pass transistor, a source of said particular multiplexing pass transistor coupled to said particular bit, and a drain of said particular multiplexing pass transistor coupled to said particular pre-shifted bit;
    a right fill pass transistor for filling in appropriate most significant bits on right shift operations and operable to couple a fill bit to said particular bit within each array responsive to a right fill control signal enabling said right fill pass transistor, said right fill control signal coupled to a gate of said right fill pass transistor, a source of said right fill pass transistor coupled to said particular bit, and a drain of said right fill pass transistor coupled to said fill bit;
    a left fill pass transistor for filling in appropriate least significant bits on left shift operations and operable to couple a predetermined voltage level to said particular bit responsive to a left fill control signal enabling said left fill pass transistor, said left fill control signal coupled to a gate of said left fill pass transistor, a drain of said left fill pass transistor coupled to said particular bit, and a source of said left fill pass transistor coupled to said predetermined voltage level; and output circuitry coupled to said particular bit within each array and operable to store an output from said circuitry cell a logical value for said particular bit.

4. The circuit of claim 3 wherein said circuitry cells associated with all bits which could be shifted right of the least significant bit positions during right shift operations further comprise:

indicator bit circuitry operable to indicate whether significant bits have been shifted right of the least significant bit on right shift operations.

5. The circuit of claim 3 wherein said control decode circuitry is further operable to receive and decode a fill mode select signal, and further operable to generate control signals to supply said fill bit to said right fill pass transistors.

6. The circuit of claim 1 wherein said circuitry cells associated with all bits within said word shift array, bit 0-11 in said nibble shift array, and bit 0-2 in said bit shift array comprise one of said bit indicator circuits.

7. The circuit of claim 1 wherein said control decode circuitry is operable to receive a plurality of shift control signals and a shift count select signal generated to select one of said plurality to be used to control said shift arrays.

* * * * *